United States Patent
Wolfer et al.

(10) Patent No.: US 6,215,265 B1
(45) Date of Patent: *Apr. 10, 2001

(54) SYSTEM AND METHOD FOR CONTROLLING ACTIVATING ACTUATOR MOTORS FOR VARIOUS MECHANISMS, SUCH AS ROLLER SHUTTERS, AWNINGS AND MOVIES SCREENS

(75) Inventors: Hermann Wolfer; Dieter Walddoerfer, both of Lenningen (DE)

(73) Assignee: Elero Antriebs- Und Sonnenschutz-Technik GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/554,992

(22) Filed: Nov. 13, 1995

(30) Foreign Application Priority Data

Nov. 14, 1994 (DE) .................................. 44 40 449

(51) Int. Cl.<sup>7</sup> ........................................................ H02P 3/00
(52) U.S. Cl. ............................................ 318/434; 318/466
(58) Field of Search .................................... 318/432, 436, 318/266, 267, 269, 466–470; 49/26, 28, 29, 30, 138; 160/291, 292, 293.1; 361/23, 30, 31, 55

(56) References Cited

U.S. PATENT DOCUMENTS

| | | | |
|---|---|---|---|
| 3,634,664 | * | 1/1972 | Valek .................................. 318/561 X |
| 3,783,556 | * | 1/1974 | Cook ......................................... 49/25 |
| 4,045,973 | * | 9/1977 | Anderson et al. ...................... 62/158 |
| 4,117,408 | | 9/1978 | Comstedt . |
| 4,383,206 | * | 5/1983 | Matsuoka et al. ................ 318/466 X |
| 4,429,265 | * | 1/1984 | Barnard ................................. 318/475 |
| 4,452,292 | * | 6/1984 | Leivenzon et al. ................... 160/133 |
| 4,455,517 | * | 6/1984 | Mitchell ................................ 318/283 |
| 4,492,908 | * | 1/1985 | Stockle et al. ....................... 318/663 |
| 4,562,387 | * | 12/1985 | Lehnhoff ............................... 318/285 |
| 4,887,205 | * | 12/1989 | Chou .................................... 364/400 |
| 4,902,953 | * | 2/1990 | Kraft et al. ........................... 318/663 |
| 5,057,760 | * | 10/1991 | Dadpey et al. ....................... 318/807 |
| 5,069,000 | * | 12/1991 | Zuckerman .............................. 49/28 |
| 5,198,974 | | 3/1993 | Orsat . |
| 5,218,282 | * | 6/1993 | Duhame ................................ 318/434 |
| 5,334,876 | * | 8/1994 | Washeleski et al. ................. 49/26 X |
| 5,369,342 | * | 11/1994 | Rudzewicz et al. ............... 318/49 X |
| 5,422,551 | * | 6/1995 | Takeda et al. ........................ 318/265 |
| 5,497,326 | * | 3/1996 | Berland et al. ...................... 49/28 X |

FOREIGN PATENT DOCUMENTS

| | | |
|---|---|---|
| 3933266A1 | 10/1989 | (DE) . |
| 4211495A1 | 4/1992 | (DE) . |
| 4312987A1 | 4/1993 | (DE) . |
| 4440449C2 | 11/1994 | (DE) . |
| 0 083 974 | 1/1983 | (EP) . |
| 0 497 711A1 | 1/1992 | (EP) . |
| 0 552 459A1 | 12/1992 | (EP) . |

* cited by examiner

*Primary Examiner*—Jonathan Salata
(74) *Attorney, Agent, or Firm*—Eugene E. Renz, Jr. PC

(57) ABSTRACT

A method and system for detecting a predefined level of resistance in motor activated drive systems for activating devices such as roller shutters, rolling gates, jalousies, awnings and movie screens in a predetermined direction or path. The method includes means for sensing predetermined characteristics of the electric motor when the electric motor is activated to move the drive in the predetermined path and detecting a predefined change in the motor characteristics due to the blockage or resistance. The electric motor is deactivated when a predefined level of resistance is detected along the predetermined path which blocks movement of the drive by the electric motor in the predetermined direction for a predetermined time period. The drive is a tubular slide-in drive, wherein the electronic components including the micro controller which is necessary for controlling the stopping is provided within the tubular, and wherein the roller shaft comprises a mechanical play within the tubular slide-in drive of approximately

4 Claims, 2 Drawing Sheets

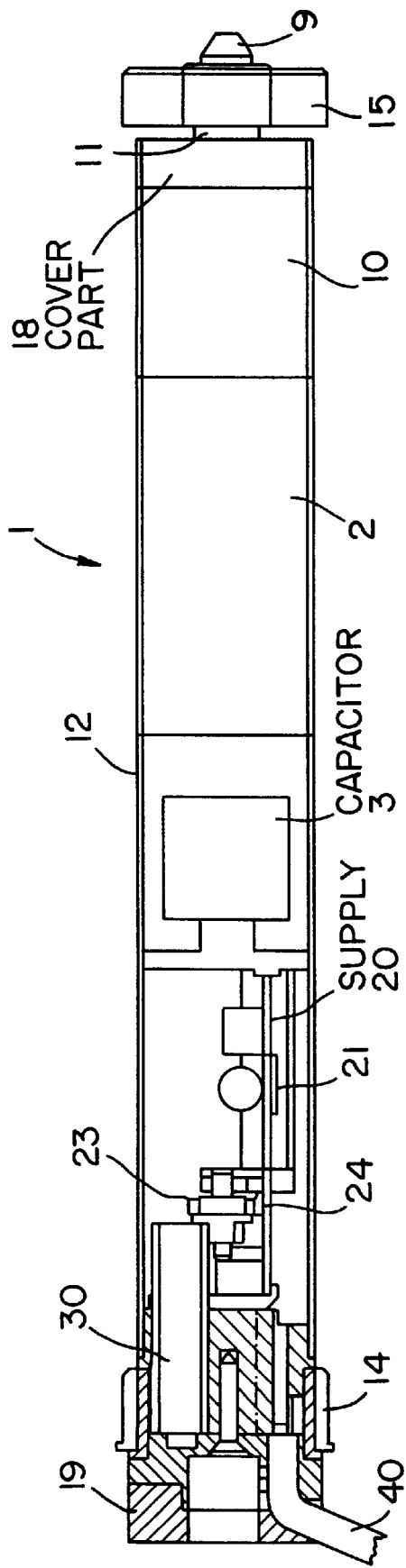
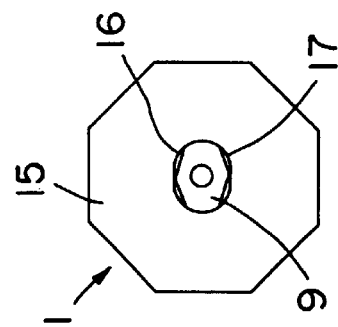
FIG. 1
FIG. 2

SYSTEM AND METHOD FOR CONTROLLING ACTIVATING ACTUATOR MOTORS FOR VARIOUS MECHANISMS, SUCH AS ROLLER SHUTTERS, AWNINGS AND MOVIES SCREENS

FIELD OF THE INVENTION

The invention pertains to a process for automatically stopping drives which contain electric motors for devices such as roller shutters, rolling gates, jalousies, awnings and movie screens and to a system for implementing this process.

BACKGROUND OF THE INVENTION

In electrically operated devices such as roller shutters, rolling gates, jalousies, awnings, movie screens, etc., the conventional way of setting the desired end positions is to use adjustable mechanical limit stop switching devices. Examples of drives of this type are known from DE No. 3,011,706 C2 and DE No. 4,402,524 C2. In these known drives, the drive shaft of the drive is stopped in an upper and lower end position by means of so-called shaft limit switches. So that shaft limit switches of this type can be adjusted, the switch usually has setting buttons, by means of which the relative position of cam wheels inside the shaft limit switch can be reset. So that the lower end position can be adjusted, the roller shutter, etc., must first be rolled down, and just before it reaches the desired lower end position, the set button responsible for shutting off the motor must be pushed. A similar process is used to set the upper end position of the jalousie.

Shaft limit switches of this type are relatively complicated in their design, and, depending on the location where they are installed, it can often be difficult to adjust them because of difficulty of access. In addition, these known shaft limit switches are unable to protect the roller shutters, etc., from damage as they are rolled up and down. That is, if the roller shutter becomes jammed or blocked as it is rolled up or down, the known shaft limit switches do not shut off the drive because these switches are designed only to turn the drive off at the end position. The drive therefore continues to run and can therefore damage the component being driven and even, in an extreme case, destroy it.

Another problem is the possibility that ice can form on the roller shutter, etc., to be actuated, wherein, for example, it is in its lower end position where it can thus be immobilized. When the electric motor is turned on, it will heat up because of the extreme load, and the thermal safety system will be actuated. The driven component can also be damaged in this case as well.

SUMMARY OF THE INVENTION

The invention provides a process and a system by means of which, regardless of whether shaft limit switches are present or not, the drive can be stopped safely when the roller shutter, etc., reaches its end position. The invention protects both the roller shutter, etc., as well as the drive from damage.

The invention advantageously provides simplicity of design, automatic recognition of end position, reliable protection from damage to the roller shutter, as well as enables connection of electric motors in parallel.

The system and method of the present invention are based essentially on the continuous measurement of the torque of the electric motor after it has been turned on so that the motor can be shut off either when a predefined torque is exceeded or when a predefined change in torque is exceeded.

By monitoring the torque of the electric motor as the roller shutter, etc. is rolled up and down, it is possible to detect both abrupt changes in the torque and torques which exceed a certain maximum value. When the roller shutter, etc., arrives at its upper or lower end position, a change will occur in the torque, which is recognized by a suitable detection device with an associated control unit, and this results in the automatic shut-off of the electric motor. It is also possible, furthermore, to provide stop bars for the roller shutters at the upper and lower end positions, these bars being installed where the roller shutter, etc., is intended to stop. As soon as the roller shutter contacts these stop bars, the torque of the electric motor changes, and this change is detected. Although shaft limit switches can still be used, they are no longer necessary.

In addition, it is ensured by means of the process according to the invention that if the roller shutter, etc., becomes jammed or blocked during its upward or downward progress, that the electric motor will be turned off safely because of the higher torque developed in the electric motor or because of the associated change in the torque. Because of this safety shut-off, the motor is prevented from overheating, and damage to the component being driven by the motor is reliably prevented.

The electric motor is shut off when a certain predefined torque is exceeded, and it is a simple matter to read this maximum torque from a table into the control unit for the motor. The table is stored in a nonvolatile data memory unit of the control unit and is drawn up for the specific type of electric motor being used. The table also takes into account the actual operating voltage of the electric motor, which ensures that the predefined torque is adjusted to the actual operating conditions.

An especially simple way of detecting the load and thus the torque of the electric motor includes evaluating the phase shift of the current flowing through the phase windings of the electric motor. If the electric motor has at least two phase windings and one capacitor, then it is possible to derive the actual torque of the electric motor from the phase shift of the current flowing through these two phase windings. A small phase shift correlates with a heavy load, whereas a large phase shift correlates with a light load and therefore with a small amount of torque on the electric motor.

By monitoring the phase shift between the two motor windings, it is possible to avoid a separate sensor for measuring the speed or torque. As a result, the system for implementing the process according to the invention can be a very simple design.

In an elaboration of the invention, the phase shift between at least two motor windings is detected and stored in memory just after the electric motor has ben turned on. This stored value is continuously updated. That is, after a predefined time interval, which can vary from 100 to 800 msec, an, updated value replaces the old value. The control unit can thus enable turning off the electric motor whenever it detects a predefined, maximum allowable change in the phase shift with respect to the immediately preceding stored phase shift value.

It has been found that detecting the torque of the electric motor is sufficient, especially in the case of heavy roller shutters, rolling gages, etc., to provide a reliable criterion for turning off the electric motor.

Elaborations of the process according to the invention are intended to increase the reliability with which the electric motor is turned off.

For this purpose, it is possible, for example, to monitor the rpm's of the roller shaft on which the roller is mounted and which is connected to the drive by way of a roller shaft coupling. When the speed of the roller shaft falls below a certain defined value, the electric motor is again turned off. The predefined speed of the roller shaft at which the electric motor is turned off can vary and is preferably selected as a function of the instantaneous position of the roller shutter, etc.

After the motor has been turned off because its speed has fallen below the predefined speed of the roller shaft, or because the predefined torque of the electric motor has been exceeded, or because the predefined change in torque of the electric motor has been exceeded, the direction in which the electric motor was rotating immediately prior to the shut-off is blocked. This is an effective way of preventing the motor from continuing to turn in the blocked direction after it has been turned on again.

In a further elaboration of the invention, a limited amount of play is built in between the roller shaft and a drive shaft driven directly by the drive. Because of this play, the drive shaft can continue to rotate by the amount of this play after the roller shaft has stopped turning. The continued rotation of this drive shaft by the amount of the play after the roller shaft has stopped also serves as a criterion for turning off the electric motor.

A system for implementing the process for automatically stopping drives with electric motors for roller shutters, etc., is provided with a power supply device, a switching device for turning the electric motor on and off, and a control device for actuating this switching device. In addition, this system also has an electronic device for monitoring the rotational motion of the electric motor and especially its torque. This electronic device is therefore connected to the control device and supplies it with an actual-value signal for the actual rotational speed or actual torque of the electric motor. Inside the control unit, which preferably is a microcontroller, this actual-value signal is compared with a reference value. If the actual-value signal deviates from the reference signal by more that a certain predefined amount, the switching device is actuated to turn off the electric motor.

The microcontroller is connected to a nonvolatile memory unit, which stores data specific to the drive.

A phase difference measuring device, by means of which the phase shift of the current flowing through at least two of the phase windings of the electric motor can be detected is used to monitor the torque or rotational load.

In addition, the control unit can also be equipped with a speed measuring device for detecting the rpm's of the roller shaft.

An especially reliable and nevertheless simple embodiment of a speed detecting device for the roller shaft consists of a multipole ring magnet, which is connected nonrotatably to the roller shaft, and a Hall sensor, which detects the changes in the magnetic field generated by the ring magnet as it rotates. The changes in the magnetic field detected by the Hall sensor as the multipole ring magnet rotates show up in the output signal of the Hall sensor in the form of flank changes, which are a direct measure of the rotational speed of the roller shaft. This signal is sent to the control unit, where it can therefore be processed as a speed signal.

It is preferable for the drive for the roller shutter, etc., to be designed as a tubular slide-in drive. The necessary electronic components for monitoring the process of stopping the shutter can thus be installed in the tube of the tubular slide-in drive along with the motor, the gearing, the motor capacitor, etc. Although a tubular slide-in drive of this type does not differ in any purely external way from conventional tubular slide-in drives, the often complicated process of adjusting the shaft limit switches, with which these older slide-in drives always had to be equipped, is now eliminated.

The tubular slide-in drive is provided with a roller shaft coupling, which is connected preferably with some play to the drive shaft of the drive. The roller shaft tube is seated on the roller shaft coupling. The tubular slide-in drive is installed inside the roller shaft tube, and the roller shaft tube is seated by way of a roller shaft carrier ring on the tubular slide-in drive. The electronic device for detecting the speed of the roller shaft is connected by way of gears or drive to the roller shaft carrier ring, so that the speed of this ring can be detected.

To provide the limited play mentioned above between the drive and the roller shaft coupling and therefore the roller shaft, the roller shaft coupling, in the form of a flat ring, is preferably installed on a tang of the drive shaft of the tubular slide-in drive. The tang projects through a central hole in this flat ring, and in the area inside the hole, the tang has a cross section which allows it to rotate to a limited extent, which means that it has a limited amount of play. It has been found favorable for the hole in the center of the flat ring to be rectangular and for the cross section of the tang to be approximately trapezoidal. It is also possible for the play to be provided inside the tubular slide-in drive.

BRIEF DESCRIPTION OF THE DRAWINGS

These and other objects of the present invention and the various features and details of the operation and construction thereof are hereinafter more fully set forth with reference to the accompanying drawings, where:

FIG. 1 shows a cross-sectional view, from the side, of a tubular slide-in drive according to the invention with a slide-in tube and a roller shaft carrier coupling;

FIG. 2 shows an end view of the tubular slide-in drive shown in FIG. 1, the end provided with the roller shaft carrier coupling.

DETAILED DESCRIPTION OF THE PREFERRED EMBODIMENT

Figure 3:
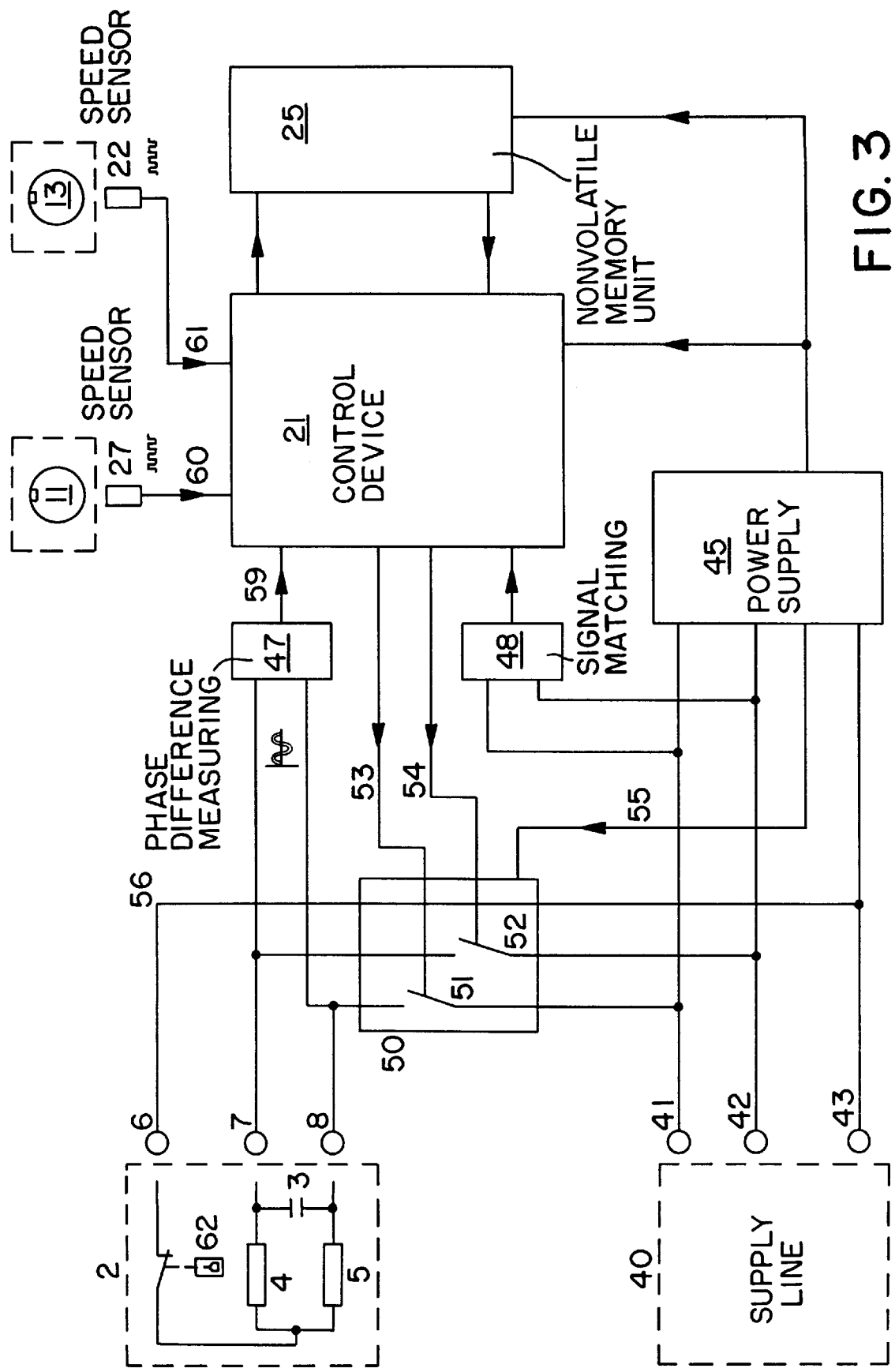
FIG. 3 shows a block circuit diagram of a possible circuit for operating the tubular slide-in drive according to FIGS. 1 and 2.

FIG. 1 shows a exemplary embodiment of a drive according to the invention for monitoring the stopping of motorized roller shutters, rolling gages, awnings, return motion systems, movie screens, etc. A drive (1) is designed as a tubular slide-in drive with a tubular housing (12) which is closed at the ends by a front cover part (18) and a rear cover part (19).

Inside tube (12), an electronic unit (20) and a control device (21), especially a microcontroller for electronically monitoring and stopping tubular slide-in drive (1), are provided on the left. To the right of electronic unit (20) is a motor capacitor (3), followed by a motor (2) and its gearing (10).

A drive shaft (11) which ends with a so-called "tang" (9), projects from front cover part (18). A roller shaft coupling (15) is seated on tang (9). Roller shaft coupling (15) is connected to a roller shaft, which is not shown for the sake of clarity. The roller shutter, etc., to be actuated, is attached to roller shaft coupling (15). On the other end of drive (1), i.e., at the end opposite roller shaft coupling (15), there is a roller carrier ring (14), which is connected nonrotatably to the roller shaft. Roller shaft carrier ring (14) is connected by way of its own gearing or a drive (30) to a speed detecting device which detects the rpm's of the roller shaft. As shown in FIG. 1, this speed detector is a multipole ring magnet (23) with a Hall sensor (24).

FIG. 1 also shows a power supply line (40) which is required to supply electronic unit (20) and the electronic motor with electric power.

The way in which a tubular slide-in drive (1) of this type operates is described in greater detail in conjunction with the block circuit diagram in FIG. 3.

It has been found advantageous for roller shaft coupling (15), which is designed as a flat ring and which is seated on tang (9), to be installed with a limited amount of mechanical play on tang (9). This is advantageous in ensuring that the electric motor will be shut off reliably, especially when relatively light-weight roller shutters, jalousies, etc., are being drive, because the continued rotation of the drive after the roller shaft has reached its lower end position and thus stopped moving can be used as an additional shutoff criterion for the electric motor. If, for example, the systems used to measure the torque of the electric motor fails for any reason, it is still possible to derive a shut-off criterion simply from the supply voltage being sent to the electric motor and from the fact that the roller shaft has stopped moving.

FIG. 2 shows an example of a design for providing a limited amount of mechanical play between roller shaft coupling (15) and tang (9) of tubular slide-in drive (1). Roller shaft coupling (15) is designed as a flat ring with an octagonal outside contour. Roller shaft coupling (15) has a central hole (16), with an approximately rectangular shape. Drive shaft (11) with it tang (9) is situated concentrically in hole (16). Tang (9) has a cross section which allows tang (9) to rotate to a limited extent inside hole (16), which thus makes available play (17). It has been found favorable with respect to the amount of play for tang (9) to be free to rotate over an angle of about 20–40°. In FIG. 2, the cross section of tang (9) is approximately trapezoidal. This play can be also be designed with elastic behavior.

The limited play provided also makes it possible for shut-off of the electric motor to be initiated with greater sensitivity.

FIG. 3 shows a block circuit diagram of the electronic unit which is installed in tubular slide-in drive (1) illustrated in FIG. 1. The same reference numbers designate the parts already described. Electric motor (2) has two motor windings (4,5) which are connected by one of their terminals to each other and which are connected in turn by way of a motor thermostat (62) to a motor terminal (6). The two other terminals of motor windings (4,5) are connected to each other by way of a motor capacitor (3). The two terminals of motor capacitor (3) are connected to motors (7,8). Motor terminals (6,7,8) are connected to feed line terminals (41, 42,43) of feed line (40). Through terminals (41,42,43), feed line (40) provides electric motor (2) with the current required for the motor to rotate either to the right or to the left. In the exemplary embodiment shown in FIG. 3, the phase for rotation to the right is connected to feed terminal (41), whereas the phase for rotation to the left is connected to feed terminal (42). A neutral conductor is connected to feed terminal (43). Motor terminal (6) is connected directly to feed terminal (43), whereas motor terminals (7,8) are connected to feed terminals (41,42) by switching device (50). Switching devices (51,52) are components of power switching device (50).

Switching devices (51,52) can be, for example, relay switches. In addition, it is possible for the circuit to be driven by suitable semiconductor switches such as triacs or thyristors.

The advantage of these semiconductor switches is the possibility of phase control, by means of which the nominal moment of electric motor (2) can be influenced in an controlled manner to prevent destruction of the driven component.

An advantage of connecting the electric motor in this way to feed line (40) is that voltage of one motor terminal is independent of the voltage of the motor terminal of the opposite direction. If, for example, electric motor were turning to the right, switching device (51) would be closed, whereas switching device (52) would be open. Because feed terminals (41,42) are independent of each other with respect to their voltage, any number of electric motors can be connected in parallel, as a result of which higher torques and therefore heavier loads can be moved by several tubular slide-in drives.

Power switching device (50) is controlled by control signals on control lines (53,54), which are made available by control device (21). Control device (21) can be a microcontroller connected to memory unit (25) which is preferably nonvolatile. Various sensor signals are sent to control device (21) to activate power switching device (50), and therefore switching devices (51,52), on and off as needed. In the exemplary embodiment of FIG. 3, control device (21) receives three sensor signals, namely, an actual-value signal (59) for the current torque of electric motor (2), a sensor signal (60) which represents the rpm's of drive shaft (1), and a sensor signal (61) which is a measure of the speed of roller shaft (13). Sensor signals (60,61) are made available by speed sensor devices (22,27) respectively.

It should be pointed out explicitly in this connection that for implementation of the invention, it is already sufficient in principle to detect merely the torque of electric motor (2) and to make it available in the form of an actual-value signal (59). The other two sensor signals (60,61) serve to increase the reliability with which the electric motor is turned off and are therefore provide redundancy.

Actual-value signal (59), which represents the torque of electric motor (2), is made available in the exemplary embodiment of FIG. 3 by the use of a phase-difference measuring device (47). This phase difference measuring device (47), which is connected on the input side to motor terminals (7,8), detects the current flowing through the two motor windings (4,5) and its phase shift. The phase shift is a measure of the instantaneous torque of electric motor (2). There is therefore no need to mount a separate sensor on the drive shaft of electric motor (2), which could be a complicated task.

FIG. 3 also shows a power supply unit (45), which, on the input side, is connected to feed terminals (41,42,43) of feed line (40). Power supply device (45) serves to supply memory unit (25), control device (21), and power switching device (50) with power. Finally, control device (21) is connected by means of signal matching component (48) to feed terminals (41,42).

The way in which drive (1) of this type operates is as follows:

After drive (1) has been turned on, the supply voltage for electric motor (2), i.e., the voltage in feed line (40), is detected by control device (21). In correspondence with this supply voltage, a maximum phase shift value corresponding to the nominal moment of electric motor (2) is read in from a table, which has been filed in the preferred nonvolatile memory unit (25) and which has been calculated for the rating of electric motor (2). If this maximum phase shift value is exceeded during the motion of the roller shutter, etc., control device (21) will drive power switching device (50) in such a way that electric motor (2) is turned off. In addition, control device (21) detects not only situations in which the maximum phase shift value and thus a predefined torque have been exceeded but also situations which a predefined change in torque and therefore a predefined change in the phase shift have been exceeded. For this purpose, after the supply voltage has been turned on, the phase shift between the motor windings (4,5) is detected. This measurement value is stored and continuously updated. After a predefined time interval, a new actual value for the phase shift is stored. If a predefined, maximum allowable change in the phase shift is exceeded in comparison with the immediately preceding phase shift value stored in memory, control device (21) generates a signal on its two control lines (53,54) which opens switching devices (51,52) and thus turns off electric motor (2).

When there is a rapid change in the phase shift and therefore a significant change in the torque, which means that the roller shutter, etc., has become jammed or has struck an obstacle, the roller shutter is safely brought to a stop.

As a shut-off criterion, it is advantageous to detect not only the torque of electric motor (2) but also the speed of the roller shaft. As roller shaft carrier ring (14) is turned by drive (30), it also pulls multipole, e.g., 16-pole, ring magnet (23) along with it. As magnet (23) turns, it produces a certain pulse sequence at the output of a magnetic sensor, e.g., a Hall sensor (24), mounted near ring magnet (23). The duration of the pauses in the pulse sequence at that output of Hall sensor (24) is inversely proportional to the speed of roller shaft carrier ring (14) and therefore a function of the movement of the driven roller shutter, etc. In a manner similar to that of a "watchdog switch", the pauses in this signal trigger a monitoring period running in control device (21). If roller shaft carrier ring (14) and therefore the roller shaft itself are turning too slowly or not at all, this time will expire. Electric motor (2) is then turned off, and this direction of the rotation is blocked. In addition, the previously received data are written into nonvolatile memory (25). If a predefined number of pulses from speed sensor (22) is exceeded within a predetermined period of time, the direction block is lifted, and the drive is started again.

In a further elaboration of the invention, the monitoring time of the Hall sensor signal varies in duration as a function of the operating state of electric motor (2). Under normal, unimpeded operating conditions, that is, not at the upper stop and not at the lower stop, and under the condition that no directional block is in effect, this monitoring time is selected so that the speed of the roller shaft may not fall below about 90% of the nominal speed. After electric motor (2) has been turned off in its lower end position as a result of the continued rotation of tang (9) of drive shaft (11) after the roller shaft has stopped, the monitoring time which must elapse before the direction block is lifted should be at least long enough to allow the available play (17) to be used up. In its upper end position and therefore after the electric motor (2) has been turned off by the detected phase shift, the monitoring time which must elapse until the direction block is lifted again should be several times longer than that required to use up the available play. That is, a certain number of pulses must counted at the output of the Hall sensor to allow further operation of the drive.

A directional block does not necessarily have to be provided, but it is advantageous to do so for safety reasons.

If such a block is in effect, electric motor (2) can operate in only the opposite direction. Electric motor (2) thus rotates through built-in play (17) between roller shaft coupling (15) and tang (9) of the drive shaft. After several flank changes of the output signal of Hall sensor (24) in the opposite direction, however, it becomes possible to take full advantage of built-in play (17) again, and the block previously imposed on the other direction of rotation is released again by control device (21).

It is advantageous for control device (21) to make sure that electric motor (2) accepts a reversal of direction only after at least a certain shut-off time as elapsed between the control commands. This shut-off time can be, for example, 300 msec. If a new control command is sent by control device (21) before the expiration of this shut-off time, the electric motor remains off until after the expiration of this shut-off time and a new control command has been received.

It is also advantageous for electric motor (2) to remain on for a predefined minimum period of time and for shorter power-on times to be ignored. The necessary power-on time is to be selected so that the buffer energy required for the storage of the data is always present. The minimum power-on time can be, for example, 300 msec.

If a directional block is still active because of the phase shift, it is advantageous for the two subsequent rotational direction commands to have a mandatory minimum length. Otherwise, the directional rotation block will be lifted and a block imposed on the opposite direction. This ensures that the purpose of the built-in play between the roller shaft coupling and the tang on the drive shaft cannot be subverted by improper manipulation.

If tubular slide-in drive (1) according to FIGS. 1–3 is installed in a roller shutter, the following applies to its upward and downward motion: During the upward motion, electric motor (2) first draws the roller shutter upward. During this action, the torque increases continuously over the course of the lower third of the distance to be traveled, and then it falls back again near the top. The control device according to the invention follows this change in torque. When the shutter reaches the top, a high torque builds up abruptly at the stop rail installed at the top. This is detected by control device 21. Electric motor (2) is turned off, and it will no longer react to any further command to roll the shutter up.

During the downward motion, the roller shutter travels toward the bottom, and if it is heavy enough, its weight will pull the drive shaft along with it. Electric motor (2) is also rotated by the weight of the roller shutter and will thus operate in practice like a generator. If the shutter stops as the result of meeting an obstacle or contacting a lower stop rail, roller shaft carrier ring (14) will stop also. Electric motor (2) is turned off and will not react to any further command to lower the shutter.

Because, from an external point of view, it is not necessary to make any changes to the design of the drive in comparison with the previously known drives for the motorized actuation of roller shutters, the process and the system according to the invention make it possible to use standard, mass-produced, pull-type couplings and standard, mass-produced armatures. The drive presented here requires in addition the same connecting lines as those which the roller shutter motors known in the past require. An advantageous feature of the invention is that is allows several motors to be connected in parallel.

It should be mentioned that motor capacitor (3) mentioned in conjunction with the phase shift can be replaced by another device which causes a shift in the phase of the current passing through at least two moor windings (4,5). For example, it is possible to connect an additional motor inductance instead of motor capacitor (3) between motor windings (4,5).

What is claimed is:

1. In a method for detecting a predefined level of resistance in motor activated drive systems for activating devices movie screens, rolling gates, jalousies, awnings and movie screens in a predetermined direction or path;

means sensing predetermined characteristics of the electric motor when the electric motor is activated to move the drive in the predetermined path;

means detecting a predefined change in the motor characteristics due to the blockage or resistance;

means deactivating the electric motor when a predefined level of resistance is detected along the predetermined path;

means blocking movement of the drive by the electric motor in said predetermined direction for a predetermined time period; and means connecting the motor to the drive with a predetermined mechanical play which permits the rotation of the drive a limited angular extent wherein the angular rotation serves as a criterion for turning off the electric motor.

2. In a system for detecting a predefined level of resistance in motor activated drive systems for activating devices movie screens, rolling gates, jalousies, awnings and movie screens in a predetermined direction or path;

means sensing predetermined characteristics of the electric motor when the electric motor is activated to move the drive in the predetermined path;

means detecting a predefined change in the motor characteristics due to the blockage or resistance;

means deactivating the electric motor when a predefined level of resistance is detected along the predetermined path;

means blocking movement of the drive by the electric motor in said predetermined direction for a predetermined time period; and means connecting the motor to the drive with a predetermined mechanical play which permits the rotation of the drive a limited angular extent wherein the angular rotation serves as a criterion for turning off the electric motor.

3. In a system for detecting a predefined level of resistance in motor activated drive systems for activating devices movie screens, rolling gates, jalousies, awnings and movie screens in a predetermined direction or path;

means sensing predetermined characteristics of the electric motor when the electric motor is activated to move the drive in the predetermined path;

means detecting a predefined change in the motor characteristics due to the blockage or resistance;

means deactivating the electric motor when a predefined level of resistance is detected along the predetermined path;

means blocking movement of the drive by the electric motor in said predetermined direction for a predetermined time period;

means connecting the motor to the drive with a predetermined mechanical play which permits the rotation of the drive a limited angular extent wherein the angular rotation serves as a criterion for turning off the electric motor; and said drive system including a roller shaft and drive shaft driven directly by drive and means providing a mechanical play between roller shaft and drive shaft whereby drive shaft can continue to rotate by the extent of the play when the roller shaft has stopped rotating as a result of resistance in the predetermined path.

4. In a method for detecting a predefined level of resistance in motor activated drive systems for activating devices movie screens, rolling gates, jalousies, awnings and movie screens in a predetermined direction or path;

sensing predetermined characteristics of the electric motor when the electric motor is activated to move the drive in the predetermined path;

detecting a predefined change in the motor characteristics due to the blockage or resistance;

deactivating the electric motor when a predefined level of resistance is detected along the predetermined path;

blocking movement of the drive by the electric motor in said predetermined direction for a predetermined time period; and the drive is a tubular slide-in drive, wherein the electronical components including the micro controller which is necessary for controlling the stopping is provided within the tubular slide, and wherein the roller shaft comprises a mechanical play within the tubular slide-in drive of approximately 20–40°.

\* \* \* \* \*